(12) United States Patent
Sassa et al.

(10) Patent No.: US 9,746,056 B2
(45) Date of Patent: Aug. 29, 2017

(54) CONTINUOUSLY VARIABLE TRANSMISSION

(71) Applicant: TOYOTA JIDOSHA KABUSHIKI KAISHA, Toyota-shi (JP)

(72) Inventors: Toyomi Sassa, Toyota (JP); Satoru Ando, Nagoya (JP); Yoshikazu Ishii, Anjo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 34 days.

(21) Appl. No.: 14/783,305

(22) PCT Filed: May 17, 2013

(86) PCT No.: PCT/JP2013/063766
§ 371 (c)(1),
(2) Date: Oct. 8, 2015

(87) PCT Pub. No.: WO2014/184945
PCT Pub. Date: Nov. 20, 2014

(65) Prior Publication Data
US 2016/0069433 A1    Mar. 10, 2016

(51) Int. Cl.
*F16G 1/21*    (2006.01)
*F16G 1/22*    (2006.01)
(Continued)

(52) U.S. Cl.
CPC .................. *F16H 9/18* (2013.01); *F16G 5/16* (2013.01); *F16H 57/046* (2013.01); *F16H 57/0489* (2013.01)

(58) Field of Classification Search
CPC . F16G 5/16; F16G 5/163; F16G 5/166; F16H 57/0489; F16H 9/18
(Continued)

(56) References Cited

U.S. PATENT DOCUMENTS 4,332,575 A * 6/1982 Hendriks .................. F16G 5/16
474/201
4,718,881 A * 1/1988 Sugimoto ................. F16G 5/18
474/201
(Continued)

FOREIGN PATENT DOCUMENTS

EP    1 167 829 A1    1/2002
JP    3-255247 A    11/1991
(Continued)

OTHER PUBLICATIONS

International Search Report issued Aug. 13, 2013 in PCT/JP2013/063766 filed May 17, 2013.

*Primary Examiner* — Henry Liu
(74) *Attorney, Agent, or Firm* — Oblon, McClelland, Maier & Neustadt, L.L.P.

(57) ABSTRACT

A continuously variable transmission is obtained by winding, around a drive sheave and a driven sheave, a continuously variable transmission belt in which a plurality of metal elements are stacked and supported on an endless ring. In at least one of the metal elements, flange parts are formed on a head part positioned at an outer peripheral side of the endless ring and a trunk part positioned at an inner peripheral side of the endless ring. The continuously variable transmission is provided with a fluid supply device which, during movement of the continuously variable transmission belt from the driven sheave to the drive sheave, sprayed lubricating oil in a movement direction of the continuously variable transmission belt, towards the flange parts.

4 Claims, 8 Drawing Sheets

(51) Int. Cl.
*F16G 5/16* (2006.01)
*F16H 57/04* (2010.01)
*F16H 9/18* (2006.01)

(58) Field of Classification Search
USPC .................................................. 474/242, 91
See application file for complete search history.

(56) References Cited

U.S. PATENT DOCUMENTS

| | | | | |
|---|---|---|---|---|
| 4,773,896 | A * | 9/1988 | Bouteiller ............... | F16G 5/166 156/139 |
| 4,826,473 | A * | 5/1989 | Miyawaki ................ | F16G 5/16 474/240 |
| 5,004,450 | A * | 4/1991 | Ide ........................... | F16G 5/16 474/242 |
| 5,033,989 | A * | 7/1991 | Shimaguchi ........ | F16H 57/0421 184/11.5 |
| 5,169,369 | A * | 12/1992 | Masuda .................... | F16G 5/16 474/242 |
| 5,800,299 | A * | 9/1998 | Lamers ............... | F16H 57/0421 474/45 |
| 6,090,004 | A * | 7/2000 | Kanehara ................ | F16G 5/16 474/201 |
| 6,537,166 | B1 * | 3/2003 | Adriaenssens .......... | B24B 29/04 451/11 |
| 6,626,783 | B1 * | 9/2003 | Shimada ................... | F16G 5/16 474/201 |
| 6,679,798 | B1 * | 1/2004 | Takagi ..................... | F16G 5/16 474/201 |
| 6,689,004 | B2 * | 2/2004 | Lolli ....................... | F16G 5/166 156/138 |
| 8,944,946 | B2 * | 2/2015 | Baba ........................ | F16G 5/16 474/201 |
| 2002/0137586 | A1 * | 9/2002 | Fujioka ................... | F16G 5/163 474/245 |
| 2004/0067808 | A1 * | 4/2004 | Kanehara ................ | F16G 5/163 474/242 |
| 2009/0280940 | A1 * | 11/2009 | Toyohara .................. | F16G 5/16 474/242 |
| 2010/0069184 | A1 * | 3/2010 | Baba ........................ | F16G 5/16 474/91 |
| 2015/0105195 | A1 * | 4/2015 | Baba ........................ | F16G 5/16 474/43 |

FOREIGN PATENT DOCUMENTS

| | | |
|---|---|---|
| JP | 6-94082 A | 4/1994 |
| JP | 10-252834 A | 9/1998 |
| JP | 2006-9950 A | 1/2006 |
| JP | 2008-128304 A | 6/2008 |
| WO | WO 98/20269 A1 | 5/1998 |
| WO | WO 2008/072069 A2 | 6/2008 |
| WO | WO 2008/072069 A3 | 6/2008 |

* cited by examiner

CONTINUOUSLY VARIABLE TRANSMISSION

CROSS-REFERENCE TO RELATED APPLICATIONS

This is a national phase application based on the PCT International Patent Application No. PCT/JP2013/063766, filed on May 17, 2013, the entire contents of which are incorporated herein by reference.

TECHNICAL FIELD

The present invention relates to a continuously variable transmission provided with a continuously variable transmission belt by which a plurality of metal elements are annularly supported.

BACKGROUND ART

For example, as shown in FIG. 11, in a continuously variable transmission (CVT) 200, a continuously variable transmission belt 100 including a plurality of stacked metal elements 101 which are supported by an endless ring 102 is wound around a drive sheave KS and a driven sheave JS. The drive sheave KS and the driven sheave JS are each provided with a fixed sheave and a movable shave of conical plate-like shapes. The CVT 200 is configured to steplessly change gears from high speed to low speed in such a way that each movable sheave moves in directions of shafts J1 and J2 to change a radius of gyration of the wound CVT belt 100.

In general, when the CVT belt 100 travels from the drive sheave KS to the driven sheave JS (in a direction indicated with an arrow FF), no gaps are present in between the metal elements 101, but when the belt 100 travels from the driven sheave JS to the drive sheave KS (in a direction indicated with an arrow FB), slight gaps (for example, about 0.5 to 0.8 mm in total) are generated in between the metal elements 101. These gaps cause slips between the metal elements 101 and the drive sheave KS in a region KD where the CVT belt 100 is wound around the drive sheave KS, lowering efficiency in transmitting a driving force.

In order to prevent the above problem, the present applicant has disclosed a technique of blowing air against the CVT belt 100 in its traveling direction to fill the gaps between the metal elements 101 in a stacking direction during the CVT belt 100 travels from the driven sheave JS to the drive sheave KS (see Patent Document 1).

RELATED ART DOCUMENTS

Patent Documents

Patent Document 1: JP-A-2008-128304

SUMMARY OF INVENTION

Problems to be Solved by the Invention

However, the invention according to the Patent Document 1 has the following problems. Namely, even if the air is blown against the CVT belt 100 in its traveling direction in order to fill the gaps between the metal elements 101 in the stacking direction, the blown air is hard to effectively work on the metal elements 101 since an outer shape of each metal element 101 is identical and every gap between the metal elements 101 is minute. Further, in the region KD where the CVT belt 100 is wound around the drive sheave KS, the gaps between the metal elements 101 in the stacking direction cannot be filled unless each metal element 101 is arranged to make a traveling speed of a head part 111 located at an outer circumferential side larger than a traveling speed of a body part 112 located at an inner circumferential side.

The present invention has been made in view of the above problems and has a purpose to provide a continuously variable transmission enabling to effectively control a posture of a metal element when a continuously variable transmission belt is about to be wound around a drive sheave and to improve efficiency in transmitting a driving force.

Means of Solving the Problems (1) To solve the above problems, one aspect of the present invention provides a continuously variable transmission including a continuously variable transmission belt provided with a plurality of metal elements supported in a stacking configuration by an endless metal ring, the continuously variable transmission belt being wound around a drive sheave and a driven sheave, wherein at least one of the metal elements has a flange portion or a recessed portion in an outer circumferential portion located at an outer circumferential side relative to the endless ring and/or in an inner circumferential portion located at an inner circumferential side relative to the endless ring, and the continuously variable transmission includes a fluid supply device for spraying a fluid onto the flange portion or the recessed portion in a traveling direction of the continuously variable transmission belt in the course of the continuously variable transmission belt traveling from the driven sheave to the drive sheave.

According to the above aspect, at least one of the metal elements has the flange portion or the recessed portion formed in the outer circumferential portion located at the outer circumferential side relative to the endless ring and/or in the inner circumferential portion located at the inner circumferential side relative to the endless ring, and the continuously variable transmission includes the fluid supply device for spraying the fluid onto the flange portion or the recessed portion in the traveling direction of the continuously variable transmission belt in the course of the continuously variable transmission belt traveling from the driven sheave to the drive sheave. Accordingly, the fluid sprayed from the fluid supply device directly acts on the flange portion or the recessed portion formed in the outer circumferential portion and/or the inner circumferential portion of the metal element, so that a posture of each metal element stacked in the traveling direction can be effectively controlled or adjusted. Therefore, when the continuously variable transmission belt is about to be wound around the drive sheave, gaps between the metal elements in the stacking direction can be surely reduced. As a result, generation of slips between the metal elements and the drive sheave can be restrained, thus improving efficiency in transmitting a driving force of the continuously variable transmission.

(2) In the continuously variable transmission according to (1), preferably, a plurality of the metal elements each having the flange portion or the recessed portion are provided, and the metal elements are placed apart from each other at a predetermined interval in a stacking direction.

According to the above aspect, the metal elements each having the flange portion or the recessed portion are placed apart from each other at the predetermined interval in the stacking direction, and hence the fluid sprayed from the fluid supply device can be periodically applied to the flange portion or the recessed portion formed in the metal elements. Accordingly, the gaps between the metal elements in the stacking direction can be periodically filled. As a result, the posture of each metal element can be further effectively adjusted, thus further surely reducing the gaps between the metal elements in the stacking direction.

(3) In the continuously variable transmission according to (1) or (2), preferably, the fluid supply device includes a first ejection port to be aimed at the flange portion or the recessed portion formed in the outer circumferential portion and a second ejection port to be aimed at the flange portion or the recessed portion formed in the inner circumferential portion, and an ejection force of the fluid to be sprayed through the first ejection port is set larger than an ejection force of the fluid to be sprayed through the second ejection port.

According to the above aspect, the fluid supply device includes the first ejection port aimed at the flange portion or the recessed portion formed in the outer circumferential portion and the second ejection port aimed at the flange portion or the recessed portion formed in the inner circumferential portion, and the ejection force of the fluid sprayed through the first ejection port is made larger than the ejection force of the fluid sprayed through the second ejection port. Accordingly, the fluid sprayed from the fluid supply device can act on the flange portion or the recessed portion formed in the outer circumferential portion of the metal element more firmly than on the flange portion or the recessed portion formed in the inner circumferential portion of the metal element. Therefore, an outer circumferential side of the metal element stacked in front can be positively pushed. As a result, in a region where the continuously variable transmission belt is wound around the drive sheave, a traveling speed at the outer circumferential side of the metal element can be made larger than a traveling speed at the inner circumferential side, enabling to further fill the gaps between the metal elements in the stacking direction. Therefore, generation of the slips between the metal elements and the drive sheave can be prevented, thus further improving the efficiency in transmitting the driving force of the continuously variable transmission.

(4) In the continuously variable transmission according to (1) to (3), preferably a thickness of the metal element having the flange portion or the recessed portion is larger than a thickness of other metal element.

According to the above aspect, the thickness of the metal element having the flange portion or the recessed portion is made larger than the thickness of the other metal element, and hence the fluid sprayed from the fluid supply device can further effectively act on the flange portion or the recessed portion formed in the metal element. To be specific, by making the thickness of the metal element provided with the flange portion larger than the thickness of the other metal element, an inertial force of the metal element which is to be pushed by the fluid is increased. Moreover, it can be achieved to keep stabilizing a posture of the metal elements which are arranged in front from a fluid-sprayed point to a position where the metal elements are about to be wound around the drive sheave. Further, by making the thickness of the metal element provided with the recessed portion larger than the thickness of the other metal element, a space between the metal elements stacked in front and in the rear of the metal element provided with the recessed portion is increased, so that the fluid sprayed from the fluid supply device is easy to enter into the space and a pushing force of the metal element is increased. As a result, the posture of the metal elements can be further effectively controlled.

(5) In the continuously variable transmission according to (1) to (4), preferably, the fluid to be sprayed from the fluid supply device is lubricating oil for the continuously variable transmission.

According to the above aspect, since the fluid sprayed from the fluid supply device is the lubricating oil for the continuously variable transmission, the fluid hardly disperses compared to air and its directivity is improved, thus the fluid can intensively acts on the flange portion or the recessed portion formed in the metal element. Therefore, an ejection force of the fluid can be surely transmitted to the metal element. Further, the lubricating oil is larger in a mass and in momentum than the air, thus enabling to increase the pressing force of the metal element. Moreover, the fluid supply device can also serve as a lubricating oil supply device for the continuously variable transmission, and therefore generation of slips between the metal elements and the drive sheave can be prevented without newly providing a lubricating oil supply device in the continuously variable transmission and the efficiency in transmitting the driving force of the continuously variable transmission can be further improved.

Effects of the Invention

The present invention can provide a continuously variable transmission enabling to effectively control a posture of a metal element and to improve efficiency in transmitting a driving force of the continuously variable transmission when a continuously variable transmission belt is wound around a drive sheave.

MODE FOR CARRYING OUT THE INVENTION

A continuously variable transmission (CVT) according to the present embodiment is now explained in detail with reference to the accompanying drawings. An overall configuration of the CVT is firstly explained and then a detailed configuration of a continuously variable transmission belt and a metal element will be explained. After that, a method for adjusting a posture of the metal element by spraying a fluid onto a flange portion or a recessed portion of the metal element will be explained.

<Overall Configuration of a Continuously Variable Transmission>

Figure 1:
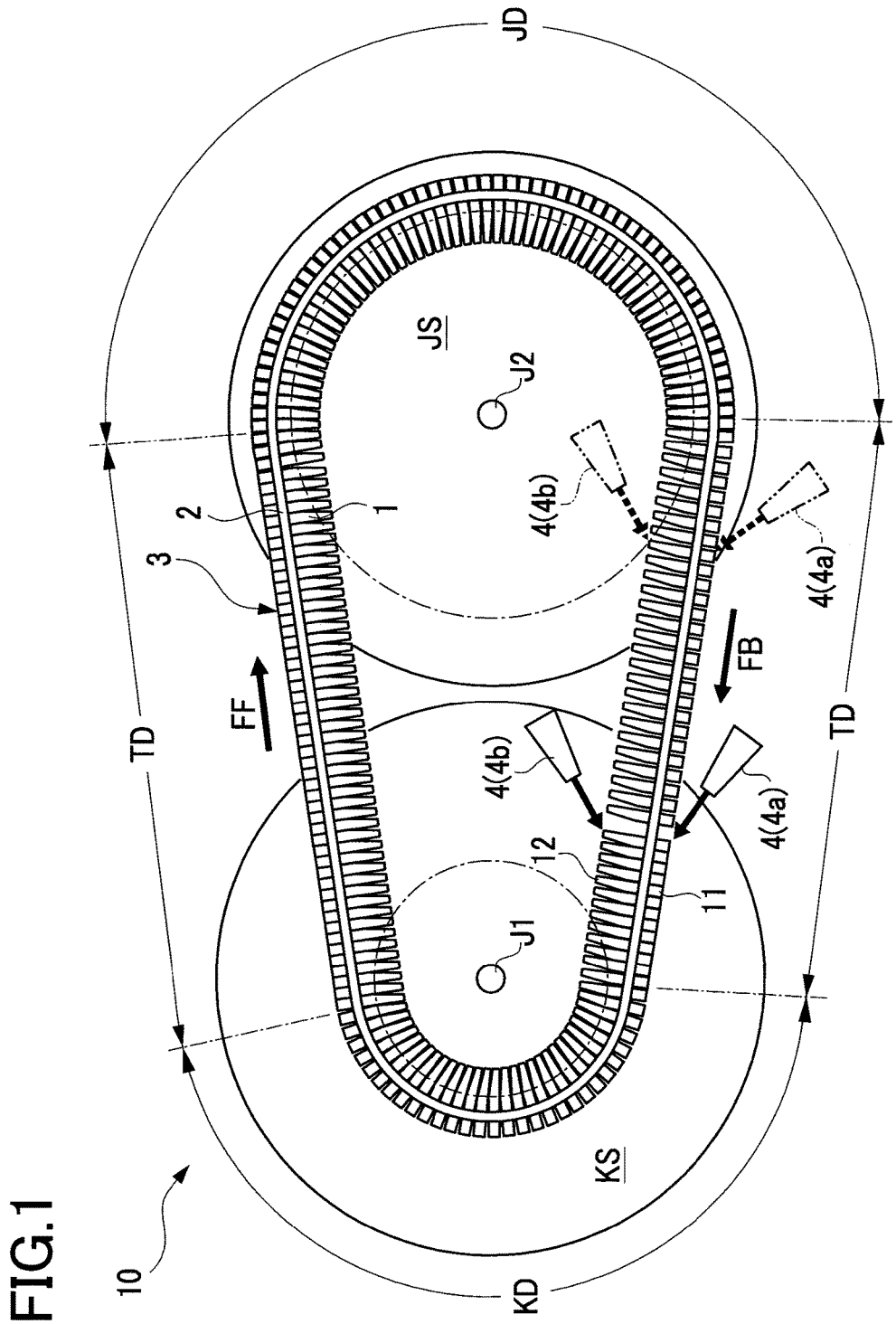
FIG. 1 is a schematic side view of a continuously variable transmission in a present embodiment.

First, the overall configuration of the CVT according to the present embodiment is explained referring to FIG. 1. FIG. 1 is a schematic side view of the CVT according to the present embodiment.

As shown in FIG. 1, a CVT 10 in the present embodiment includes a drive sheave KS, a driven sheave JS, a CVT belt 3, and a fluid supply device 4 (4a, 4b). The drive sheave KS and the driven sheave JS are each provided with a conical plate-shaped fixed sheave and a conical plate-shaped movable sheave, and their respective shafts J1 and J2 are placed apart from each other. The CVT 10 is configured to steplessly change gears from high speed to low speed in a way that each movable sheave moves along the shafts J1 and J2 to change a radius of gyration of the wound CVT belt 3. Since the CVT belt 3 is a push-type belt, the CVT belt 3 is arranged such that no gap is generated between the metal elements when the belt 3 moves in a direction from the drive sheave KS to the driven sheave JS (in a direction indicated with an arrow FF), but slight gaps (0.5 to 0.8 mm in total, for example) are generated between the metal elements when the belt 3 travels in a direction from the driven sheave JS to the drive sheave KS (in a direction indicated with an arrow FB). For filling the gaps generated between the metal elements 1, the fluid supply device 4 (4a, 4b) includes an ejection port 4a for ejecting a fluid (lubricating oil) onto a head part 11 of the metal element 1 and an ejection port 4b for ejecting a fluid (lubricating oil) onto a body part 12 of the metal element 1 in the course of the CVT belt 3 traveling in the direction from the driven sheave JS to the drive sheave KS (in the direction indicated with the arrow FB). In the present figure, the ejection port 4a and the ejection port 4b are located near an entrance of the drive sheave KS, but the ports may be located in other portions. For example, the ports may be located near an exit of the driven sheave JS (as indicated with imaginary lines). Further, ejection force of the ejection ports 4a and 4b may be differentiated by for example making an ejection amount or an ejection speed of the fluid (lubricating oil) ejected through the ejection port 4a larger than an ejection amount or an ejection speed of the fluid (lubricating oil) ejected through the ejection port 4b.

<Detailed Configuration of a Continuously Variable Transmission Belt and a Metal Element>

Figure 2:
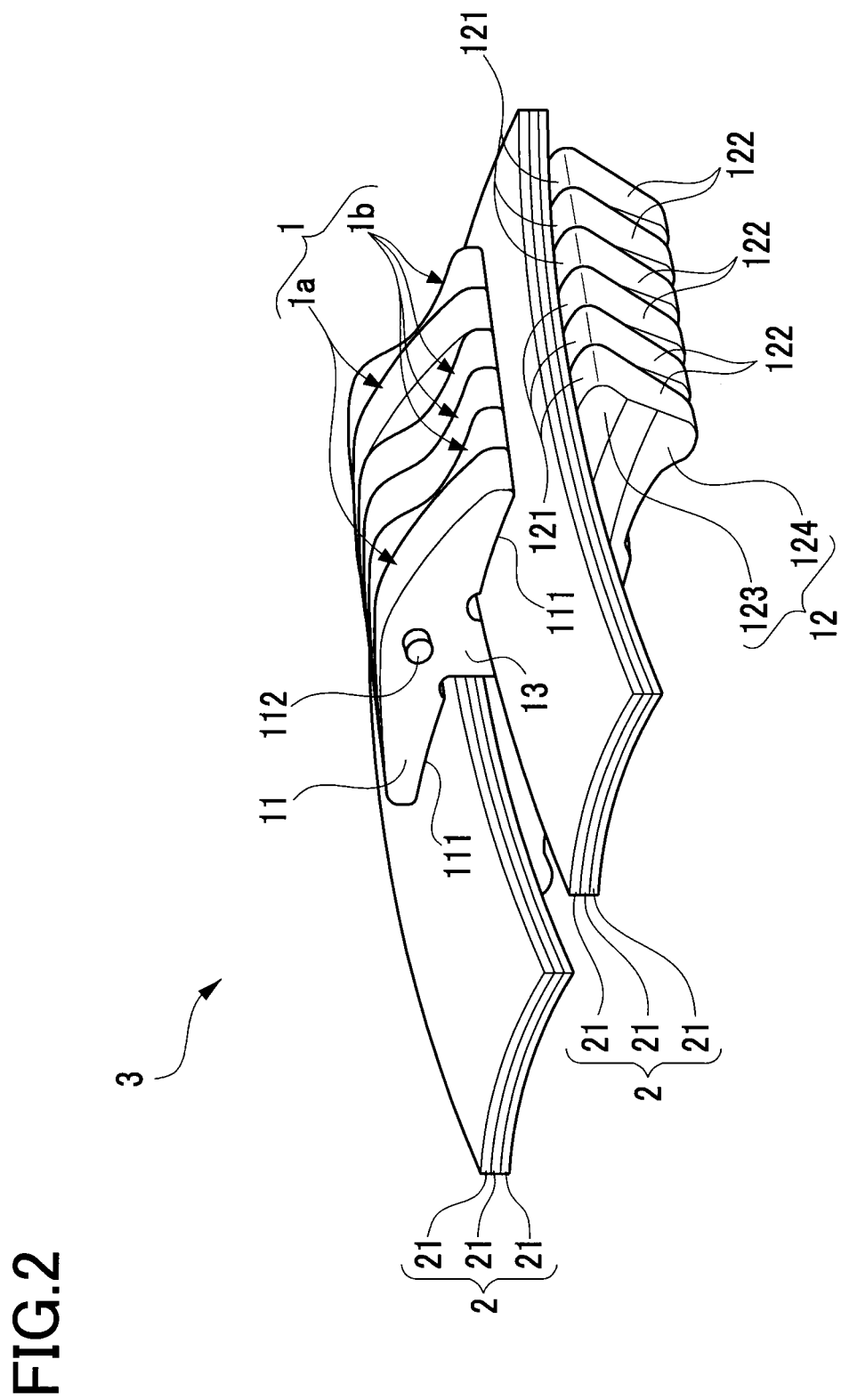
FIG. 2 is a partial perspective view of a continuously variable transmission belt shown in FIG. 1.
Figure 3:
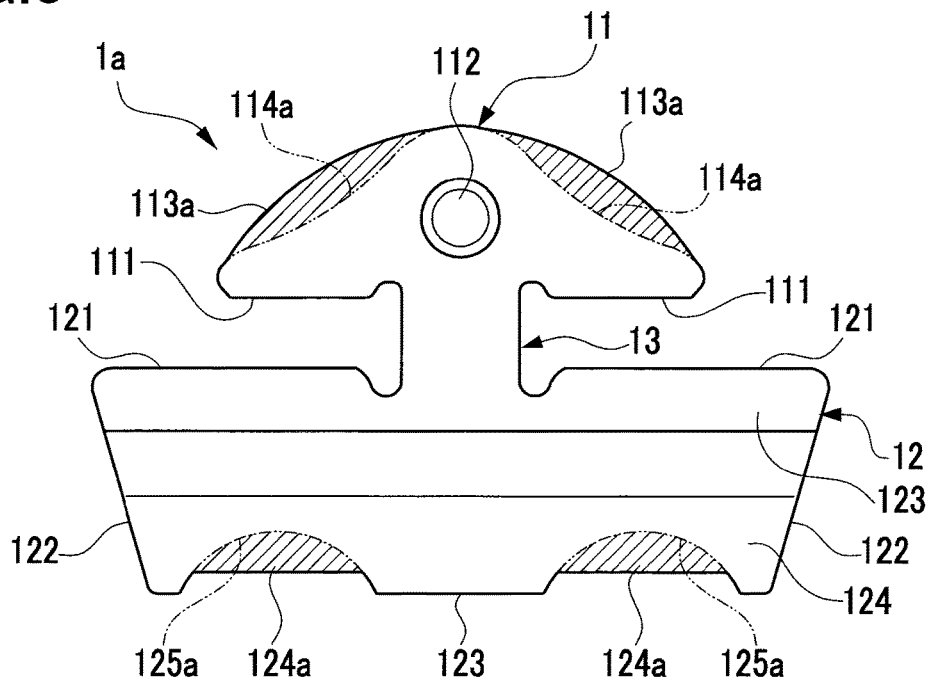
FIG. 3 is a front view of a first metal element (provided with flange portions in a head part and a body part) shown in FIG. 1.
Figure 4:
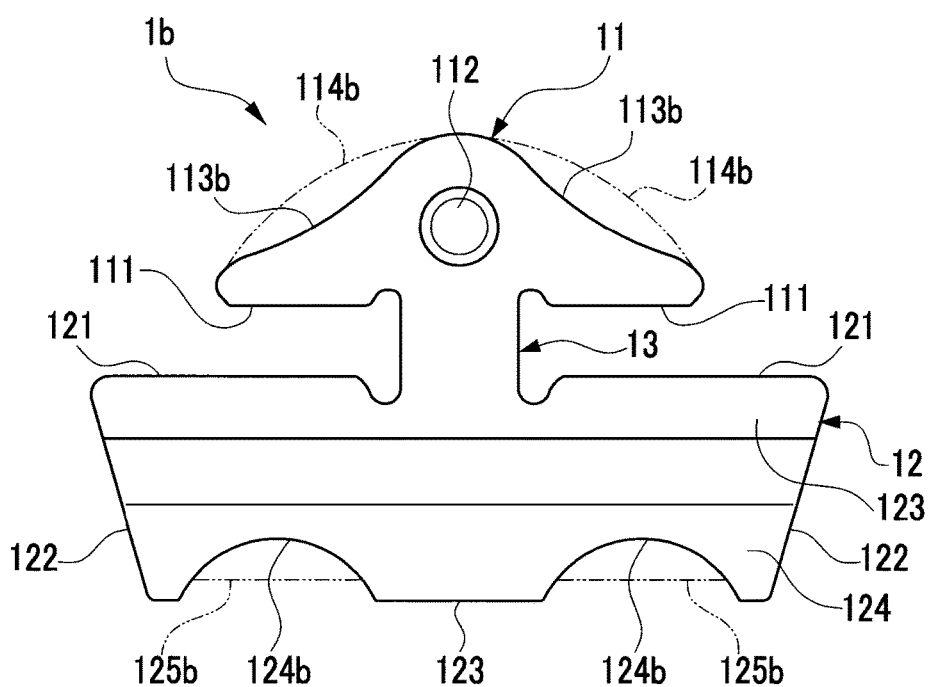
FIG. 4 is a front view of a second metal element (not provided with the flange portions in the head part and the body part) shown in FIG. 1.
Figure 5:
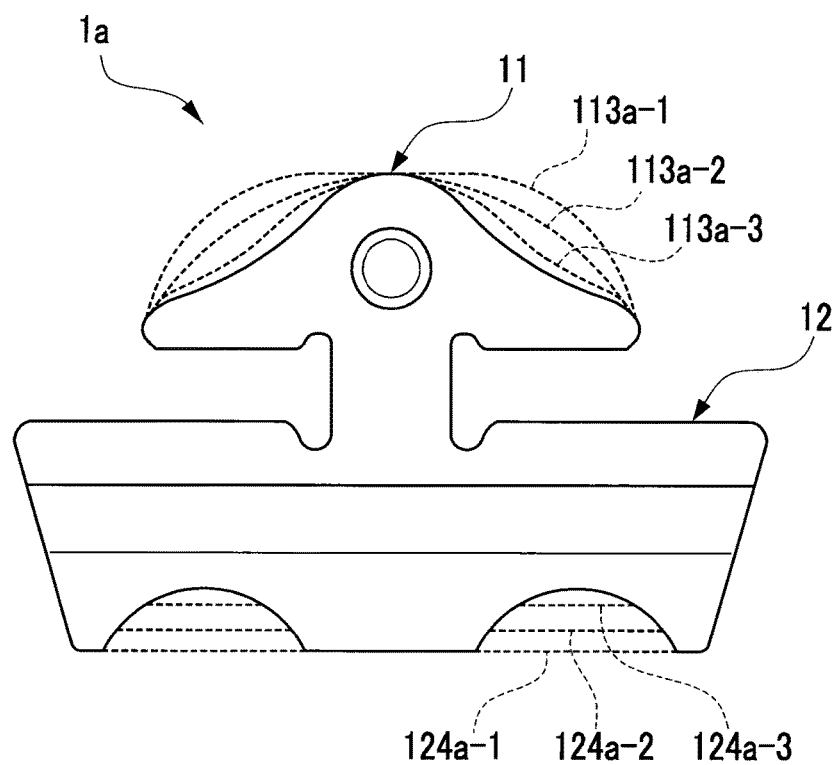
FIG. 5 is a front view of the first metal element showing shape variations of the flange portion.

Next, a detailed configuration of the CVT belt and the metal element is explained with reference to FIGS. 2 to 5. FIG. 2 is a partial perspective view of the CVT belt shown in FIG. 1. FIG. 3 is a front view of a first metal element (provided with flange portions in the head part and the body part) shown in FIG. 1. FIG. 4 is a front view of a second metal element (not provided with the flange portions in the head part and the body part) shown in FIG. 1. FIG. 5 is a front view of the first metal element shown in FIG. 1, showing shape variations of the flange portion.

As shown in FIG. 2, the CVT belt 3 is provided with two types of metal elements 1 (1a, 1b) and the endless rings 2. The two types of metal elements 1 (1a, 1b) are placed such that first-type (first) metal elements 1a are each placed between second-type (second) metal elements 1b to have a predetermined interval in the stacking direction. Herein, the first metal element 1a is placed one in each three of the second metal elements 1b but the number of the stacked second metal elements 1b is not limited to three. Further, a plurality of the first metal elements 1a may be stacked and then a plurality of the second metal elements 1b are stacked to make a predetermined interval in the stacking direction in between the first metal elements 1a and the second metal elements 1b. The detailed configuration of the first metal element 1a and the second metal element 1b will be explained later.

The two types of the metal elements 1 (1a, 1b) are each shaped as a plate-shaped body formed of an almost triangular head part 11, an almost rectangular body part 12, and a neck part 13, the head part 11 and the body part 12 being connected via the neck part 13. The head part 11 corresponds to "an outer circumferential portion" described in claims and the body part 12 corresponds to "an inner circumferential portion" described in the claims. The body part 12 has a thick portion 123 having a thick thickness and a thin portion 124 located beneath the thick portion 123 and having a thickness gradually decreasing downward. At both left and right ends of the body part 12, slanted surfaces slanted inwardly and downwardly are formed. The slanted surfaces constitute a drive transmission part 122 which is to be in frictional contact with conical wall surfaces of the drive sheave KS and the driven sheave JS to transmit a driving force.

Ring holding grooves 111 to which the endless rings 2 are inserted are formed with interposing the neck part 13 between the head part 11 and the body part 12. At a lower end of each ring holding groove 111, a saddle part 121 is formed to be in contact with an inner circumferential surface of the endless ring 2. The saddle part 121 is formed in parallel with the body part 12 at an upper end of the body part 12. The head part 11 is provided in its front end center with a protrusion 112 and in its rear end center with a recess 113 (not shown). The adjacent metal elements 1 are prevented from their displacement in an upper and lower and a left and right directions by engagement of the protrusion 112 with the recess 113. As material for the metal elements 1, steel material allowed to be heat-processed and excellent in abrasion resistance, for example, carbon tool steel (SK material) may be used. A thickness of the metal element 1 is about 1 to 2 mm. The endless ring 2 is illustrated with three layers of laminated ring bodies 21, but the number of the laminated ring bodies 21 is not limited to this, and for example, nine or twelve ring bodies 21 may be laminated. The endless ring 2 may be made of steel material allowed to be heat-processed and excellent in tensile strength and abrasion resistance, for example, maraging steel may be used. A thickness of the ring body 21 is about 150 to 200 μm.

As shown in FIGS. 3 and 4, of the two types of the metal elements, the first metal element 1a is provided with first flange portions (hatched portions) 113a extending outwardly from the head part 11 located at the outer circumferential side relative to the endless ring 2. Each of the first flange portions (hatched portions) 113a extends outwardly in a circularly arcuate shape from laterally symmetrical slanting sides (imaginary lines) 114a of the head part 11. The metal element 1a is further provided with second flange portions (hatched portions) 124a extending inwardly from the body part 11 located at the inner circumferential side relative to the endless ring 2. Each of the second flange portions (hatched portions) 124a extends outwardly in a crescent shape from laterally symmetrical circular arcuate sides (imaginary lines) 125a of the thin portion 124 of the body part 12.

Of the two types of the metal elements 1, the second metal element 1b is not provided with the first flange portions (hatched portions) 113a and the second flange portions (hatched portions) 124a which are formed in the first metal element 1a. The second metal element 1b has laterally symmetrical slanted sides 113b formed in the head part 11 and has laterally symmetrical circular arcuate sides 124b formed in the body part 12. The slanted sides 113b are of identical shape with the slanted sides (imaginary lines) 114a and the circular arcuate sides 124b are of identical shape with the circular arcuate sides (imaginary lines) 125a. The first metal element 1a and the second metal element 1b are only different in presence and absence of the first flange portions (hatched portions) 113a and the second flange portions (hatched portions) 124a and other configurations are similar to each other.

Herein, in the first metal element 1a the slanted side (imaginary line) 114a corresponds to a first groove portion, and the circular arcuate side (imaginary line) 125a corresponds to a second groove portion. When the metal element 1a is provided with the first groove portion (114a) and the second groove portion (125a), the other metal element 1b is provided with the slanted side 114b (imaginary line) and the string side 125b (imaginary line). The first flange portion (hatched portion) 113a and the second flange portion (hatched portion) 124a will be explained in detail with reference to FIGS. 6 and 7. The first groove portion (114a) and the second groove portion (125a) will be explained in detail with reference to FIGS. 8 and 9.

As shown in FIG. 5, any one of the first flange portions 113a-1, 113a-2, and 113a-3 formed in the head part 11 of the metal element 1a is selected and any one of the second flange portions 124a-1, 124a-2, and 124a-3 formed in the body part 12 of the metal element 1a is selected so that the metal element 1a is shaped to be optimum for filling the gaps between the metal elements 1. For instance, one preferable example is a combination of the first flange portion 113a-1 largely extending at the outer circumferential side and the second flange portion 124a-3 extending at a small amount at the inner circumferential side. This configuration enables to make the traveling speed of the metal elements 1 (1a, 1b) at the outer circumferential side larger than the traveling speed at the inner circumferential side in a region where the CVT belt 3 is wound around the drive sheave KS, thereby further enabling to fill the gaps between the metal elements 1 (1a, 1b) in the stacking direction. As a result, it is further facilitated to reduce slips between the metal elements 1 (1a, 1b) and the drive sheave KS.

<Method for Adjusting a Posture of a Metal Element>

Figure 6:
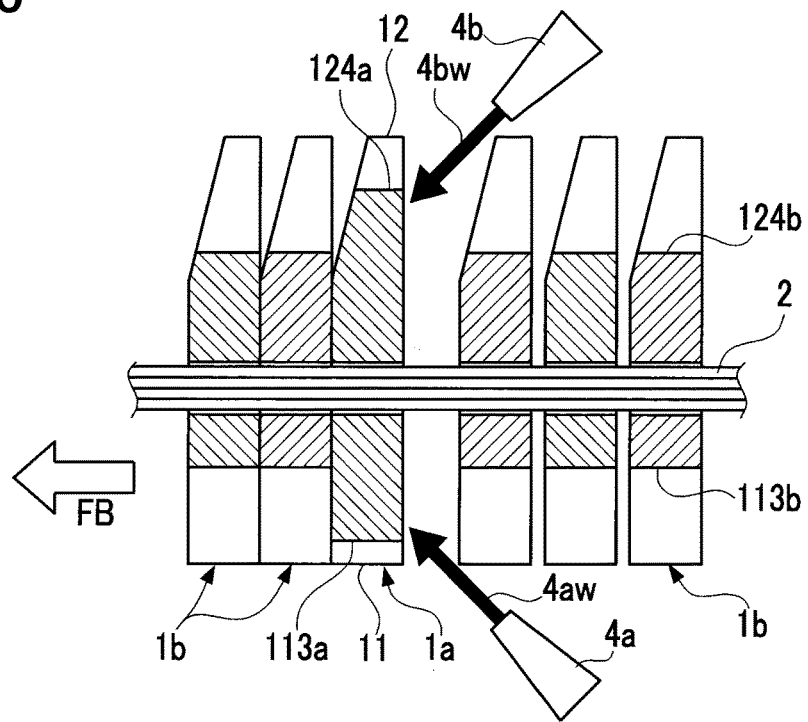
FIG. 6 is a sectional view of the continuously variable transmission belt, showing a state in which a fluid is sprayed onto the flange portions formed in the first metal element of the continuously variable transmission belt shown in FIG. 1.
Figure 7:
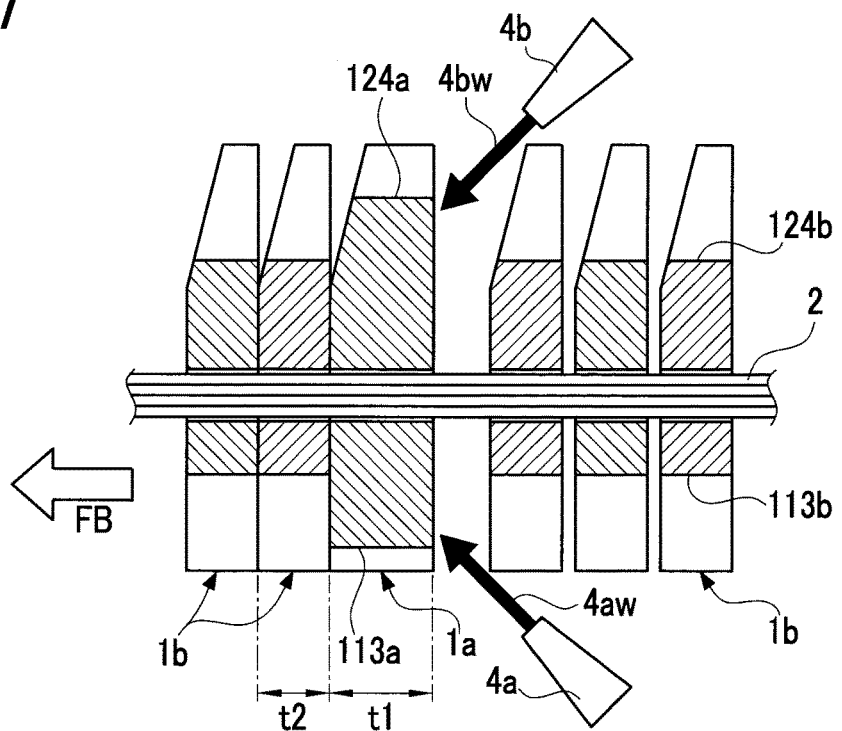
FIG. 7 is a sectional view of the continuously variable transmission belt in a case that the first metal element shown in FIG. 6 has a larger thickness than the second metal element.
Figure 8:
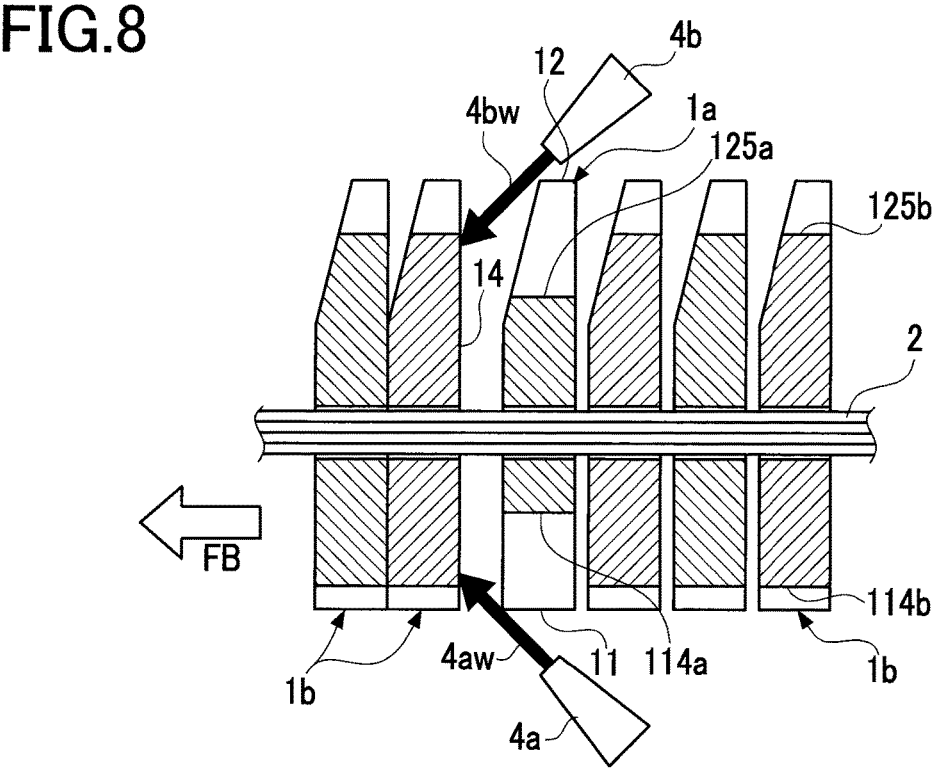
FIG. 8 is a sectional view of the continuously variable transmission belt, showing a state that a fluid is sprayed onto a recessed portion formed in the first metal element of the continuously variable transmission belt shown in FIG. 1.
Figure 9:
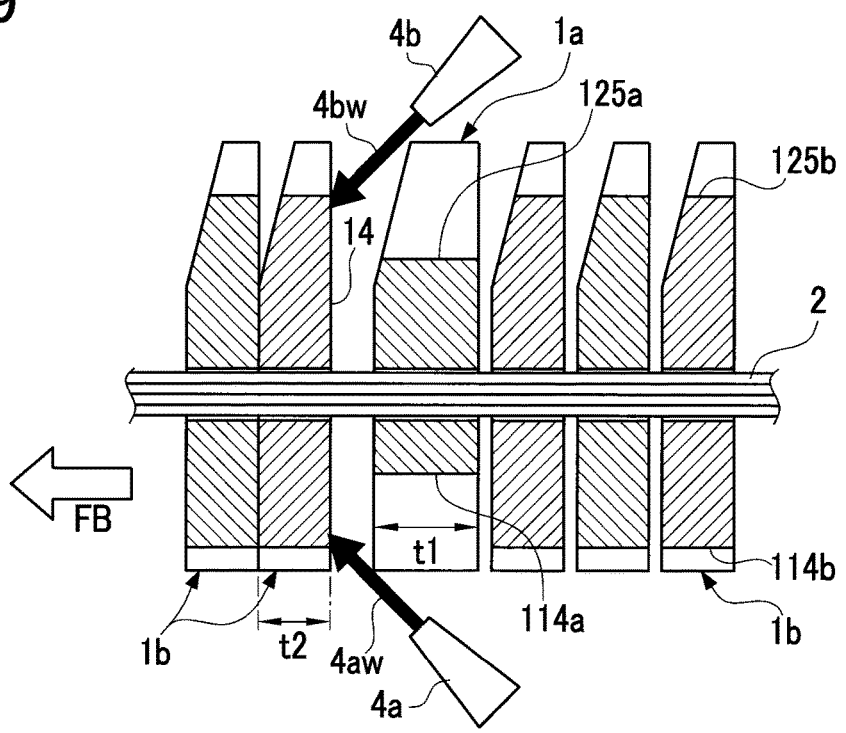
FIG. 9 is a sectional view of the continuously variable transmission belt in a case that the first metal element shown in FIG. 8 has a larger thickness than the second metal element.
Figure 10:
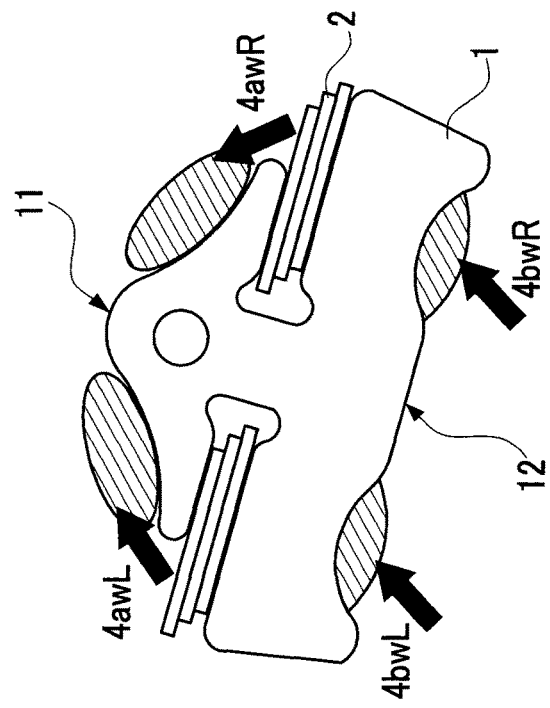
FIG. 10 is an explanatory view of explaining rotation inhibition of the metal element in the continuously variable transmission shown in FIG. 1.
Figure 10:
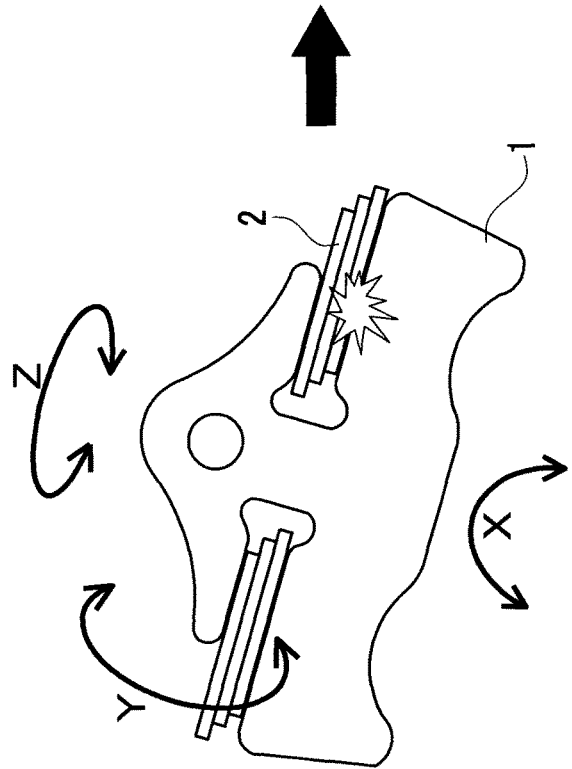
Figure 11:
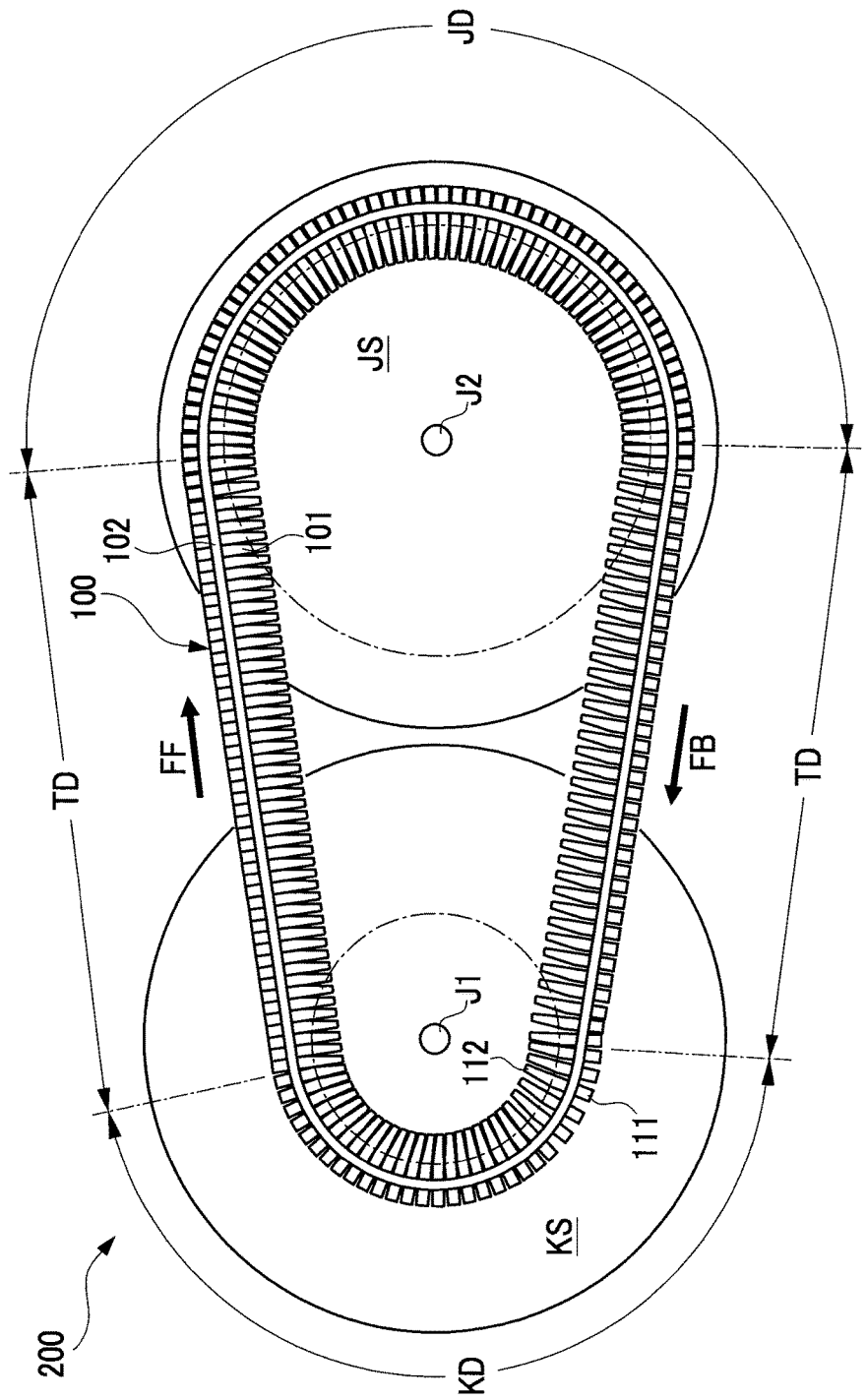
FIG. 11 is a schematic side view of a conventional continuously variable transmission.

Next, a method for adjusting a posture of the metal element is explained with reference to FIGS. 6 to 10. FIG. 6 is a sectional view showing a state that a fluid is sprayed onto the flange portions formed in the first metal element of the CVT belt in FIG. 1. FIG. 7 is a sectional view showing a case that the metal element shown in FIG. 6 has a larger thickness than the second metal element. FIG. 8 is a sectional view showing a state that a fluid is sprayed onto groove portions formed in a first metal element of the CVT belt in FIG. 1. FIG. 9 is a sectional view showing a case that the first metal element shown in FIG. 8 has a larger thickness than the second metal element. FIG. 10 is an explanatory view for explaining rotation inhibition of the metal element of the CVT belt shown in FIG. 1.

(First Example)

As shown in FIG. 6, the first example illustrates an example in which the first flange portions 113a are formed in the head part 11 of the metal element 1a and the second flange portions 124a are formed in the body part 12, and jets of fluid (lubricating oil) 4aw, 4bw are sprayed through the ejection ports 4a, 4b respectively onto the first flange portions 113a and the second flange portions 124a in a traveling direction of the CVT belt 3 during the CVT belt 3 moves in a direction from the driven sheave to the drive sheave (in the direction indicated with the arrow FB). In this example, the first flange portions 113a and the second flange portions 124a formed in the first metal element 1a extend more outwardly than the slanted sides 113b and the circular arcuate sides 124b of the other metal element 1b. Accordingly, the fluid (lubricating oil) 4aw and 4bw sprayed through the ejection ports 4a and 4b of the fluid supply device 4 is directly applied to the first flange portions 113a and the second flange portions 124a formed in the metal element 1a thus pushing the second metal element 1b stacked in the traveling direction to bring the metal elements 1 into contact with each other. As a result, it becomes possible to effectively adjust a posture of each of the second metal elements 1b which are stacked in front of the metal element 1a sprayed with the fluid (lubricating oil) 4aw and 4bw. When it is necessary to further adjust the posture of the metal element, a plurality of ejection ports 4a and 4b may be provided. For effectively and efficiently adjusting the posture, there is a case that odd number of the ejection ports are provided. In such a case, the gaps between the metal elements 1 (1a, 1b) are filled and strength of each ejection force is further controlled, so that flexibility in adjusting the posture of each metal element 1 (1a, 1b) is enhanced.

(Second Example)

As shown in FIG. 7, a second example illustrates an example in which a thickness t1 of the first metal element 1a in the first example is made larger than a thickness t2 of the second metal element 1b. By making the thickness t1 of the first metal element 1a larger than the thickness t2 of the second metal element 1b an inertial force of the metal element 1a which is to be pushed by the fluid (lubricating oil) 4aw, 4bw can be increased. As a result, the postures of the metal elements 1a and 1b stacked in front of the first metal element 1a which is sprayed with the fluid (lubricating oil) 4aw, 4bw can be maintained stably. In this example, a plurality of the first metal elements 1a with the thick thickness t1 may be provided and placed at arbitrary intervals in between the second metal elements 1b.

(Third Example)

As shown in FIG. 8, the third example illustrates an example that the first metal element 1a has first recessed portions 114a formed in the head part 11 and second recessed portions 125a formed in the body part 12 and that the fluid (lubricating oil) 4aw, 4bw is sprayed through the ejection ports 4a, 4b onto the first recessed portions 114a and the second recessed portions 125a in the traveling direction of the CVT belt 3 during the CVT belt 3 travels in a direction from the driven sheave to the drive sheave (in the direction indicated with the arrow FB). In this example, the first recessed portions 114a and the second recessed portions 125a formed in the metal element 1a are each depressed more inwardly than the slanted sides 114b and the string sides 125b of the second metal element 1b. Accordingly, the fluid (lubricating oil) 4aw, 4bw sprayed through the ejection ports 4a, 4b of the fluid supply device 4 is directly applied to a rear surface 14 of the second metal element 1b which is stacked in front of the first metal element 1a having the first recessed portions 114a and the second recessed portions 125a. Thus, the second metal elements 1b stacked in the traveling direction are pushed to come into contact with each other. As a result, it becomes possible to effectively adjust the positon of the second metal element(s) 1b stacked in front of the other metal element 1b that is sprayed with the fluid (lubricating oil) 4aw, 4bw.

(Fourth Example)

As shown in FIG. 9, the fourth example illustrates an example that the first metal element 1a in the third example has a larger thickness t1 than a thickness t2 of the second metal element 1b. This configuration enables to enlarge an interval between the second metal elements 1b which are stacked in front and in the rear of the first metal element 1a which has the first recessed portions 114a and the second recessed portions 125a and therefore the fluid (lubricating oil) 4aw, 4bw sprayed through the ejection ports 4a, 4b of the fluid supply device 4 can easily enter into the gaps, increasing the pushing force of the other metal element 1b which is sprayed with the fluid (lubricating oil) 4aw, 4bw. As a consequence, the posture of the second metal element(s) 1b stacked in front can be further effectively adjusted.

(Prevention of Interference Between the Metal Element and the Endless Ring)

A method for preventing interference between the metal element 1 and the endless ring 2 by use of the fluid supply device 4 in the first to fourth examples is explained. As mentioned above, the metal elements 1 supported on the endless ring 2 have slight gaps in between the metal elements 1 during the metal elements 1 travel in the direction from the driven sheave JS to the drive sheave KS. Therefore, as shown in FIG. 10(A), there is a case that the posture of the metal element 1 rotates in each direction indicated with arrows X, Y, and Z. Generally, rotation in a direction with the arrow X is called as rolling, rotation in a direction with the arrow Y is called as pitching, and rotation in a direction with the arrow Z is called as yawing. By any rotation in the directions X, Y, and Z, the metal elements 1 interfere with the endless rings 2, and thereby each durability of the metal elements 1 and the endless rings 2 lowers. Herein, the above mentioned fluid supply device 4 is provided with the ejection ports 4a, 4b in left and right directions. Thus, as shown in FIG. 10(B), the head part 11 of the metal element 1 can be sprayed with fluid (lubricating oil) 4awR and 4awL from the left and right directions and the body part 12 can be sprayed with fluid (lubricating oil) RbwR and RbwL from the left and right directions. As a result, rotation of the metal element 1 in each direction with the arrows X, Y, and Z can be inhibited and the interference of the metal element 1 with the endless rings 2 can be prevented, thus improving the durability of the metal elements 1 and the endless rings 2.

INDUSTRIAL APPLICABILITY

The present invention may be utilized as a continuously variable transmission provided with a continuously variable transmission belt in which a plurality of metal element are annularly supported.

REFERENCE SIGNS LIST 1, 1a, 1b Metal element
2 Endless ring
3 Continuously variable transmission belt
4 Fluid supply device
4a, 4b Ejection port of the fluid supply device
10 Continuously variable transmission
11 Head part (Outer circumferential portion)
12 Body part (Inner circumferential portion)
13 Neck part
14 Rear surface
113a, First flange portion
124a, Second flange portion
114a, First recessed portion
125a, Second recessed portion
KS Drive sheave
JS Driven sheave

The invention claimed is:

1. A continuously variable transmission including a continuously variable transmission belt provided with a plurality of metal elements supported in a stacking configuration by an endless metal ring, the continuously variable transmission belt being wound around a drive sheave and a driven sheave, wherein
at least one of the metal elements has a flange portion or a recessed portion in an outer circumferential portion located at an outer circumferential side relative to the endless ring and an inner circumferential portion located at an inner circumferential side relative to the endless ring,
the continuously variable transmission includes a fluid supply device for spraying a fluid onto the flange portion or the recessed portion in a traveling direction of the continuously variable transmission belt in the course of the continuously variable transmission belt traveling from the driven sheave to the drive sheave,
the fluid supply device includes a first ejection port to be aimed at the flange portion or the recessed portion formed in the outer circumferential portion and a second ejection port to be aimed at the flange portion or the recessed portion formed in the inner circumferential portion, and
an ejection force of the fluid to be sprayed through the first ejection port is set larger than an ejection force of the fluid to be sprayed through the second ejection port.

2. The continuously variable transmission according to claim 1, wherein a plurality of the metal elements each having the flange portion or the recessed portion are provided, and the metal elements are placed apart from each other at a predetermined interval in a stacking direction.

3. The continuously variable transmission according to claim 1, wherein a thickness of the metal element having the flange portion or the recessed portion is larger than a thickness of a metal element not having the flange portion or the recessed portion.

4. The continuously variable transmission according to claim 1, wherein the fluid to be sprayed from the fluid supply device is lubricating oil for the continuously variable transmission.

* * * * *